May 7, 1968

J. G. THOM 3,381,674

CRANKCASE EMISSION SYSTEM INTEGRATED INTO
ENGINE INTAKE MANIFOLD

Filed Jan. 27, 1966

JACK G. THOM
INVENTOR.

BY
ATTORNEYS

United States Patent Office 3,381,674
Patented May 7, 1968

3,381,674
CRANKCASE EMISSION SYSTEM INTEGRATED INTO ENGINE INTAKE MANIFOLD
Jack G. Thom, Detroit, Mich., assignor to Ford Motor Company, Dearborn, Mich., a corporation of Delaware
Filed Jan. 27, 1966, Ser. No. 523,345
3 Claims. (Cl. 123—119)

ABSTRACT OF THE DISCLOSURE

An intake manifold for an internal combustion engine. The manifold includes internally formed passage means communicating between the engine dead air space and a plurality of manifold runners so that crankcase vapors are directed to the combustion cylinders of the engine. The manifold passage means are oriented to discourage entry of the air-fuel mixture present in the runners into the passage means. Valve means, responsive to manifold vacuum, are located in the passage means to restrict the flow of crankcase vapors therethrough upon manifold vacuum reaching a predetermined value.

---

Figures 1, 2:
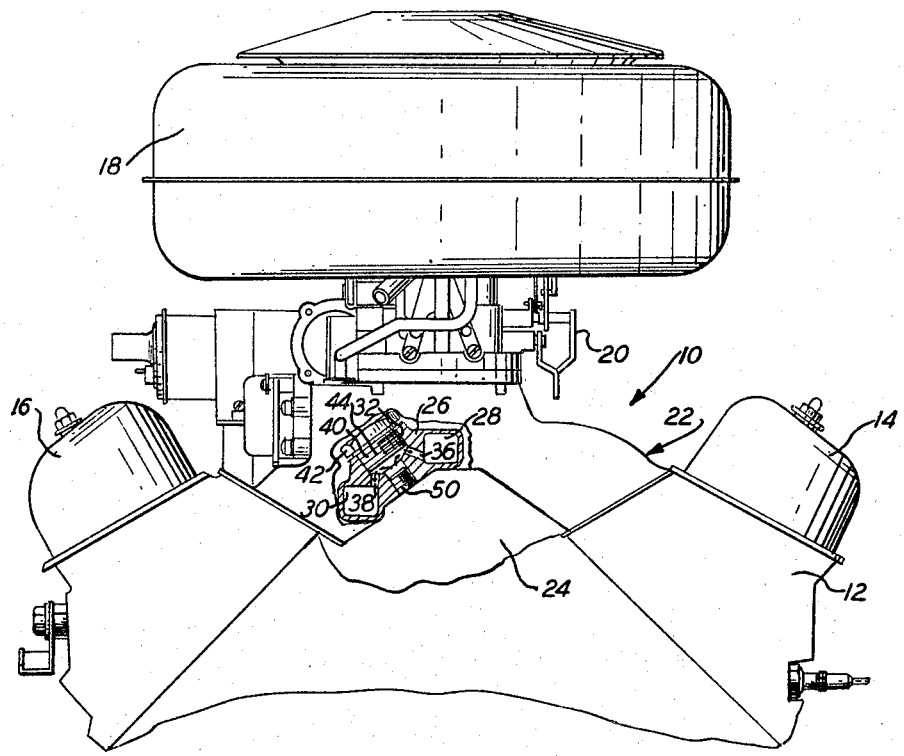

This invention relates to a crankcase emission control system for an internal combustion engine in which the crankcase emission control system is integrated with the intake manifold.

Various crankcase emission systems have been proposed that route the crankcase vapors through the combustion cycle of the engine. This is desirable so that crankcase vapors are eliminated insofar as possible rather than merely purged from the engine lubricating system into the atmosphere. These systems all utilize some sort of "plumbing" exterior of the engine which, of course, adds to the manufacturing cost of the vehicle involved. Also, the exposed projections, hoses and valves add to confusion in the vehicle engine compartment and allow for leakage and functional failures at couplings.

It is, therefore, the principal object of this invention to integrate the crankcase emission control system with the intake manifold, thus eliminating all exterior "plumbing."

A fuel intake manifold constructed in accordance with this invention includes a main body having a first surface mounting the charge forming device of the engine and a second surface that seals a portion of the engine lubrication circuit. Formed in the main body is a first passage communicating between the charge forming device and the engine block, and a second passage communicating between the lubrication circuit and the first passage. A valve is positioned in the second passage and operates to restrict the flow of crankcase vapors through the second passage when intake manifold vacuum increases.

Additional objects and advantages of this invention will become apparent as this description proceeds, particularly when considered in conjunction with the accompanying drawings wherein:

FIGURE 1 is a front elevation view of the upper portion of an internal combustion engine having a fuel intake manifold constructed in accordance with the invention and showing a portion of the intake manifold in section and FIGURE 2 is an enlarged showing of the portion of the intake manifold shown in section in FIGURE 1.

Referring now in detail to the drawings, the numeral 10 indicates generally an interal combustion engine having a cylinder block 12 mounting valve covers 14 and 16. An air cleaner assembly 18 is positioned on a charge forming device 20, i.e., a carburetor or the like, that is mounted on a fuel intake manifold generally indicated by the numeral 22. The bottom portion of intake manifold 22 covers and seals the engine dead air space 24, also commonly referred to as the valve train galley. Dead air space 24 is, of course, a portion of the fluid circuit through which engine lubricant passes in that it is in direct communication with the engine crankcase (not shown).

Referring now in detail to the fuel intake manifold 22, there can be seen a main body 26 having an upper runner 28 and a lower runner 30 formed therein. Runners of this type are well known in the art and lead from the charge forming device to the cylinder intake valves and accommodate the passage of the fuel mixture. Machined or formed by other suitable methods in main body 26 is an internally threaded passage 31 consisting of large diameter portion 32 and small diameter portion 34 that extend from the dead air space 24 to the upper surface of main body 26. Also formed in main body 26 are side passages 36 and 38 that communicate between passage 31 and runners 28 and 30 respectively. It may be seen that passages 31, 36 and 38 are oriented such that the direction of the fluid path defined thereby from dead air space 24 to runners 28 and 30, although having a positive slope along passage 31, has negative slopes along passages 36 and 38, thus discouraging the entry of the fuel mixture into passages 36 and 38.

A threaded plug 40 having head 42, large portion 44 and small portion 46 is threaded into passage 31. Plug 40 has a cut back portion 48 that communicates and cooperates with a central aperture 49 extending through small portion 46 of the plug 40 to allow the flow of crankcase vapors to proceed from passage 31 into side passages 36 and 38 as represented by the arrows shown in FIGURE 2.

A valve, indicated generally by the numeral 49, is located in small portion 34 of passage 31 and includes threaded sleeve 50 having an enlarged shoulder portion 52 that abuts portion 46 of plug 40. Tapered float 54 having a large shoulder portion 56 is located in sleeve 50 so that its small end is proximate to enlarged shoulder 52. Float 54 is held in the sleeve 50 by retaining washer 58 and is biased towards washer 58 by spring 60.

This construction of valve 49 restricts the flow of crankcase vapors from dead air space 24 into runners 28 and 30 during the periods when there is high intake manifold vacuum, such as when the engine is at idle or is being choked. This valve operation is in recognition of the fact that "blowby" the well known phenomenon substantially causing crankcase fumes, is inversely proportional to intake manifold vacuum. However, when the engine has reached its normal operating temperature and is running at partial throttle, the engine combustion cylinders easily can accept crankcase vapors for elimination by combustion without an impairment of engine operating efficiency.

Valve 49 reacts to an increase in intake manifold vacuum since this vacuum draws float 54 towards shoulder 52 and overcomes the force of spring 60. The orifice through shoulder 52 will be restricted by float 54 when the intake manifold vacuum reaches a sufficient magnitude. However, a small intake manifold vacuum, such as is present under normal engine operating conditions, is not sufficient to restrict the orifice extending through shoulder 52 because of the force of spring 60 and also because shoulder 56 of float 52 is of a smaller diameter than the inside diameter of sleeve 50. This dimension of shoulder 56 allows both a partial bleeding off of the engine manifold vacuum and also the passage of crankcase vapors past float 54.

It should be obvious to one well versed in the art that plug 40 and valve 49 may be an integral structure thus facilitating installation and maintenance.

This invention therefore provides an internal combustion engine intake manifold that allows for the elimination by combustion of unwanted crankcase vapors by evenly distributing these vapors for combustion to the cylinders of the engine. It may be seen that the valve controlling the flow of these vapors is of simple design and is accessible easily for maintenance by the removal of plug 40.

It will be understood that the invention is not to be limited to the exact construction shown and described and that various changes and modifications may be made without departing from the spirit and scope of the invention as defined in the appended claims.

I claim:

1. In an internal combustion engine having a block in which combustion cylinders are formed, a charge forming device and a fluid circuit for lubricant; a manifold including a main body having a first surface mounting said charge forming device and a second surface sealing a portion of said fluid circuit, a fluid conduit extending through said main body and communicating between said charge forming device and said block, a first passage formed in said main body and communicating with said fluid circuit, a second passage formed in said main body and communicating between said first passage and said fluid conduit, said passages being formed in said main body such that the direction of the path from said circuit to said fluid conduit through said passages has a positive slope along said first passage and a negative slope along said second passage.

2. In the internal combustion engine of claim 1, including valve means positioned in said first passage and operable to restrict fluid flow through said first passage upon a predetermined decrease in pressure in said fluid conduit.

3. In the internal combustion engine of claim 1, said manifold having a second fluid conduit extending therethrough communicating between said charge forming device and said block, and a third passage formed in said main body and communicating between said first passage and said second fluid conduit, the direction of said third passage from said first passage to said second fluid conduit having a negative slope.

References Cited

UNITED STATES PATENTS

| 2,120,050 | 6/1938 | Lowther | 123—119 |
| 2,493,617 | 1/1950 | Chubbuck | 123—44.86 X |
| 3,241,534 | 3/1966 | Kennedy | 123—119 |

AL LAWRENCE SMITH, *Primary Examiner.*